(No Model.) 5 Sheets—Sheet 4.

A. J. SHAW.
CANE OR CORN HARVESTER.

No. 372,870. Patented Nov. 8, 1887.

WITNESSES:
INVENTOR:
BY
ATTORNEYS.

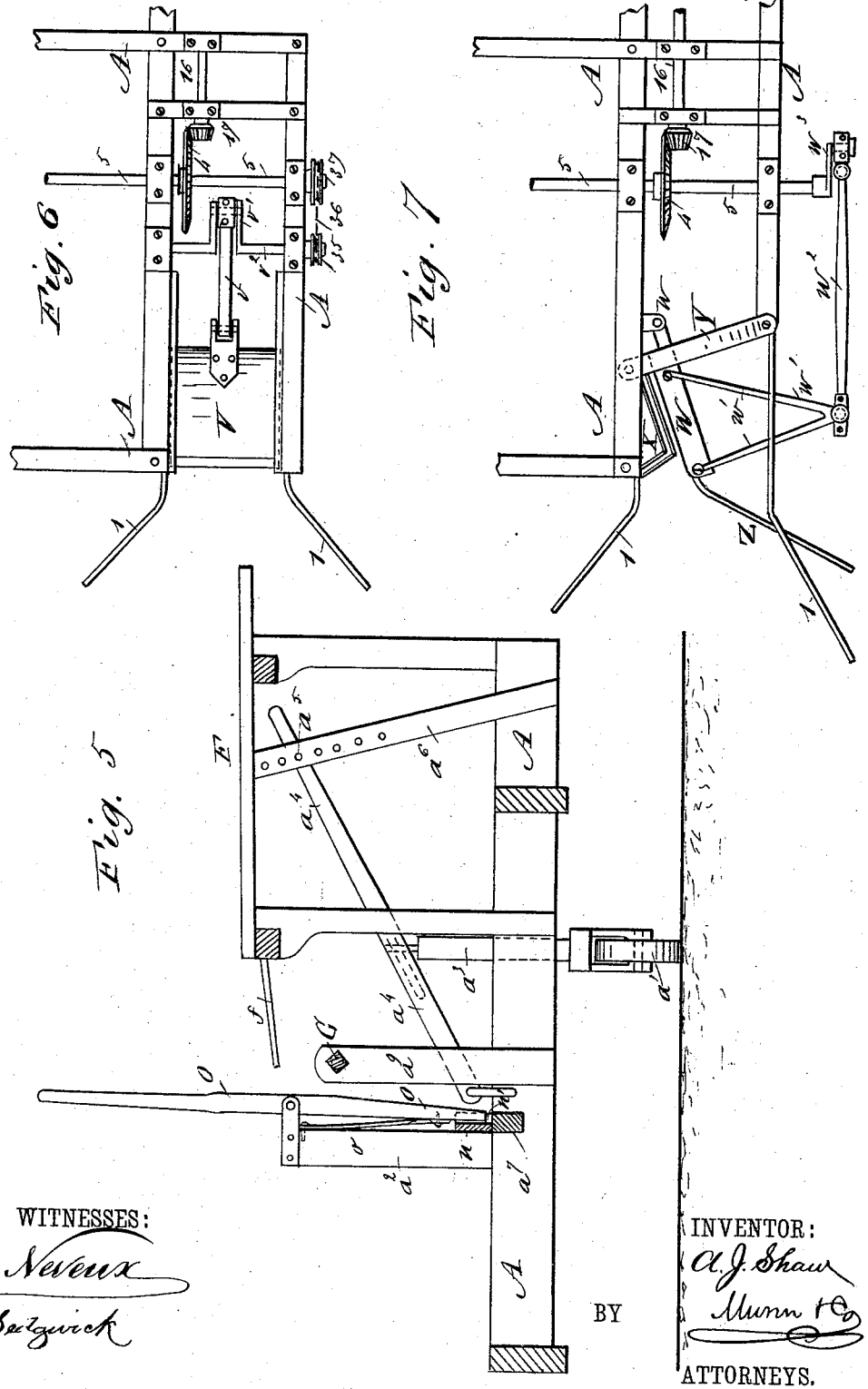

UNITED STATES PATENT OFFICE.

AZRO JAMES SHAW, OF CONWAY, KANSAS.

CANE OR CORN HARVESTER.

SPECIFICATION forming part of Letters Patent No. 372,870, dated November 8, 1887.

Application filed May 16, 1887. Serial No. 238,393. (No model.)

*To all whom it may concern:*

Be it known that I, AZRO JAMES SHAW, of Conway, in the county of McPherson and State of Kansas, have invented a new and Improved Cane or Corn Harvester, of which the following is a full, clear, and exact description.

My invention relates to a machine adapted for cutting sugar-cane, corn, or other crops grown in rows, and topping the severed stalks and discharging them to the ground at the side of the machine; and the invention has for its object to provide an effective and durable machine of this character.

The invention consists in certain novel features of construction and combinations of parts of the harvester, all as hereinafter described and claimed.

Reference is to be had to the accompanying drawings, forming a part of this specification, in which similar letters and figures of reference indicate corresponding parts in all the views.

Figure 1:
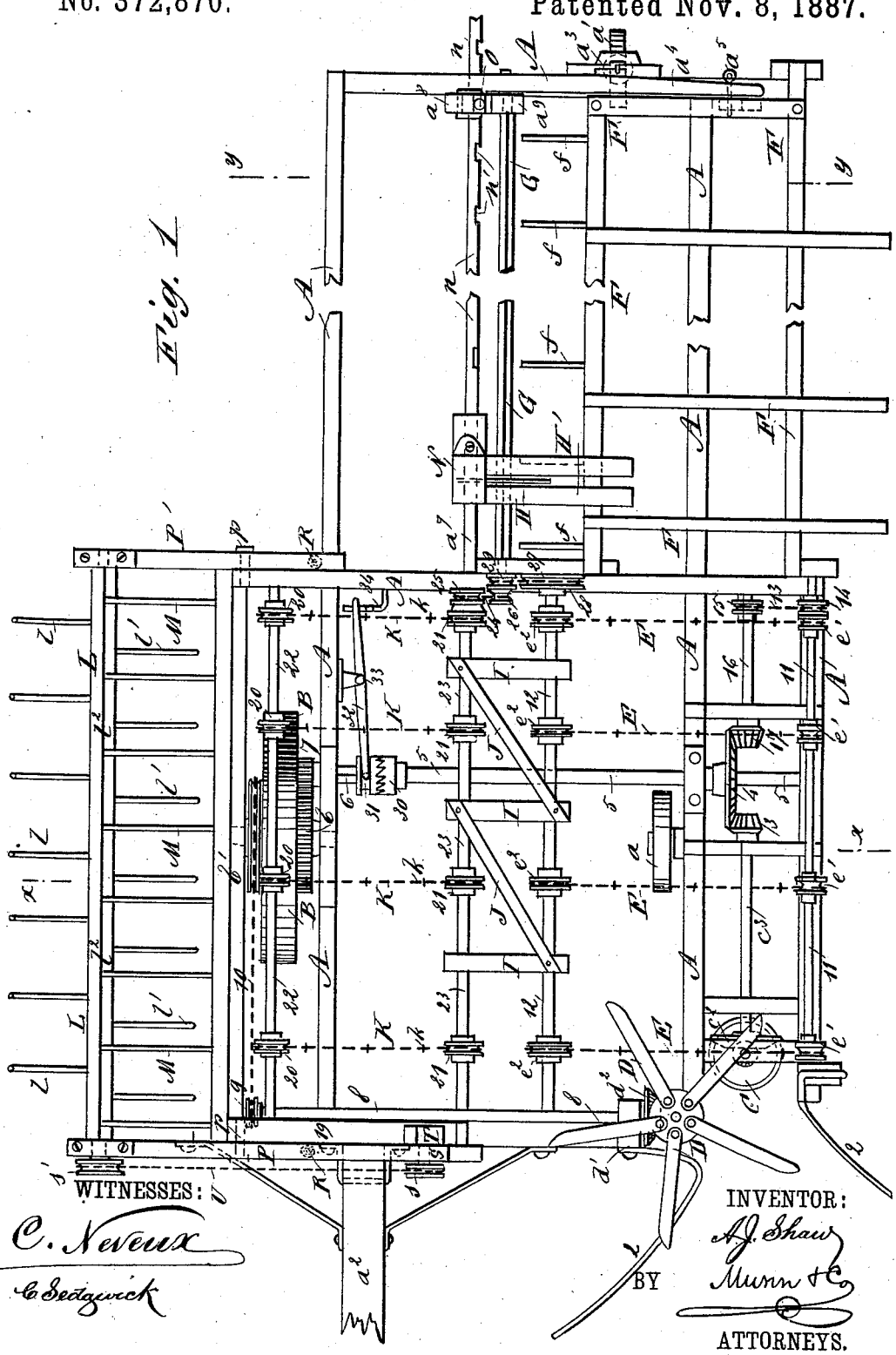
Figure 2:
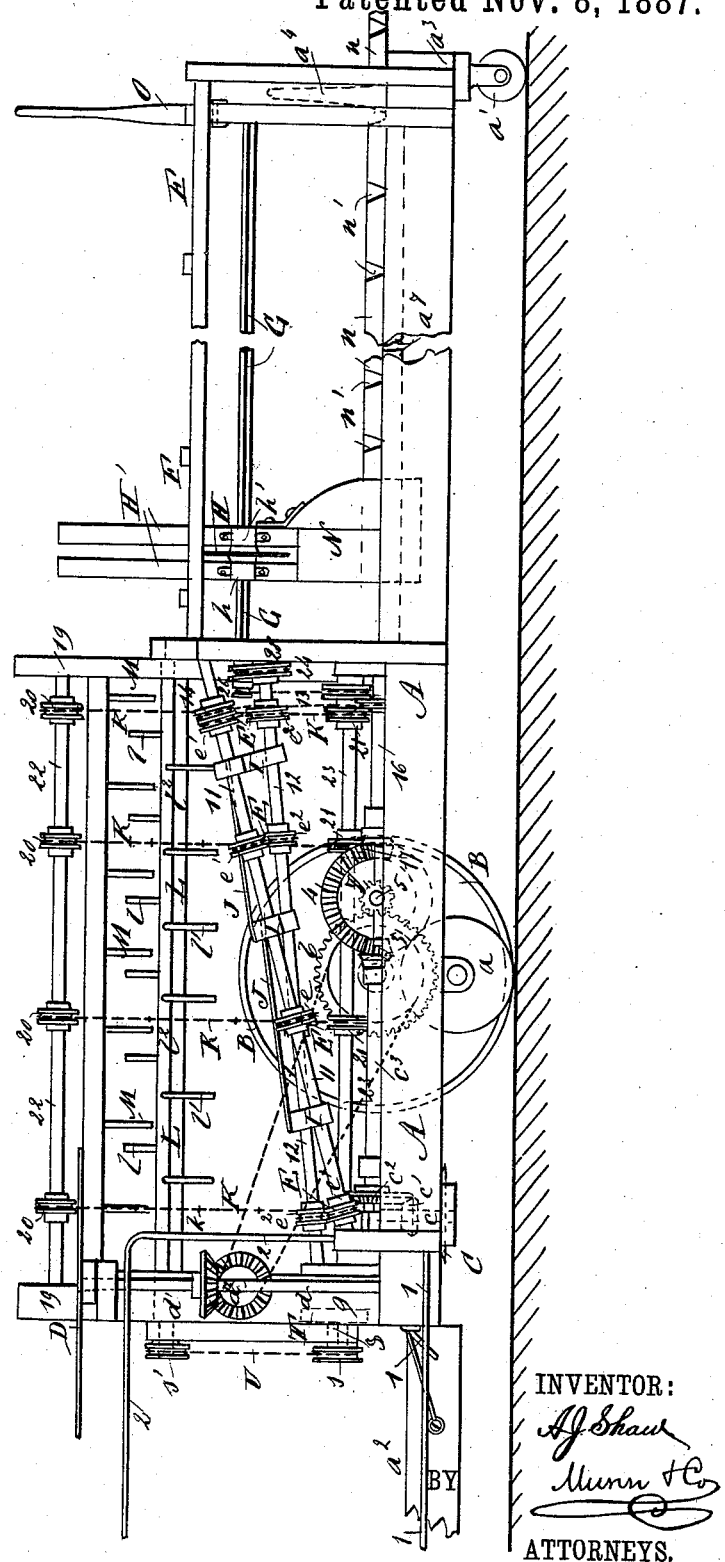
Figure 3:
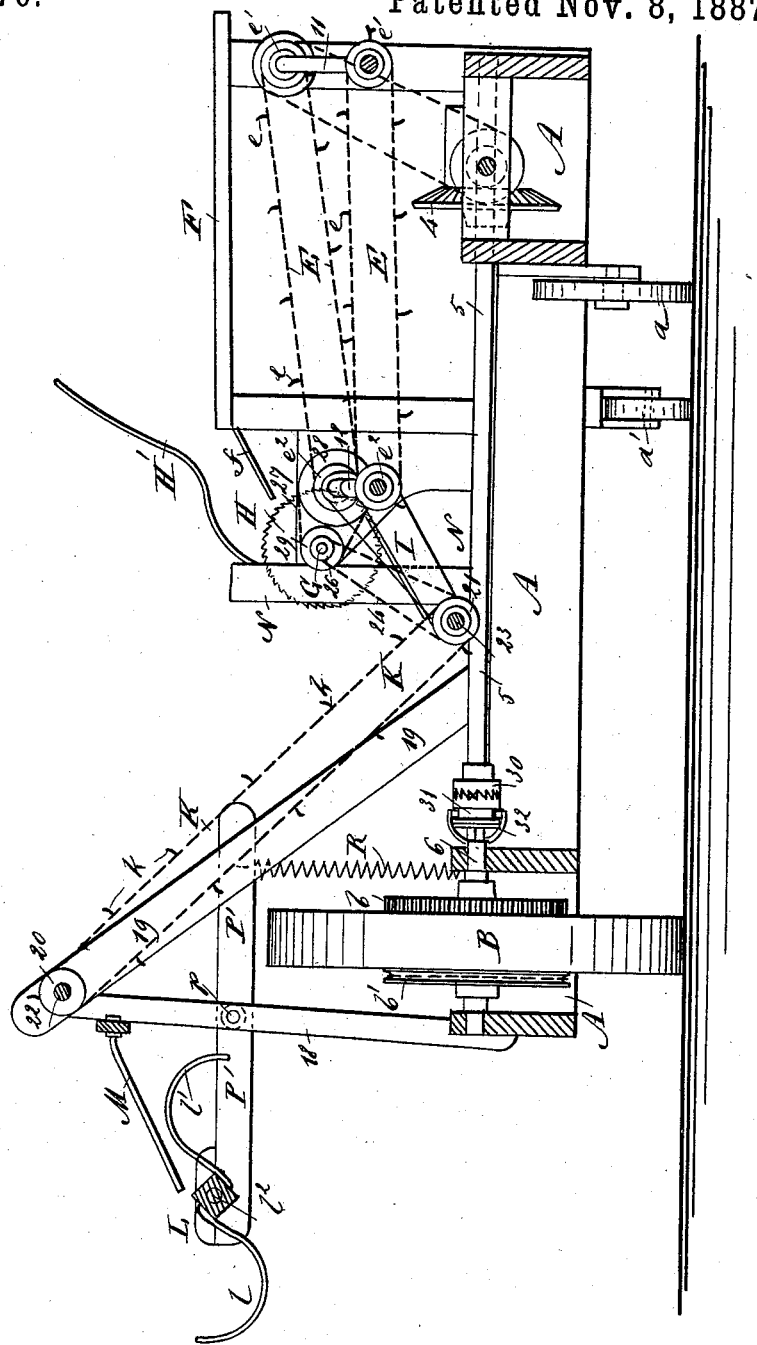
Figure 4:
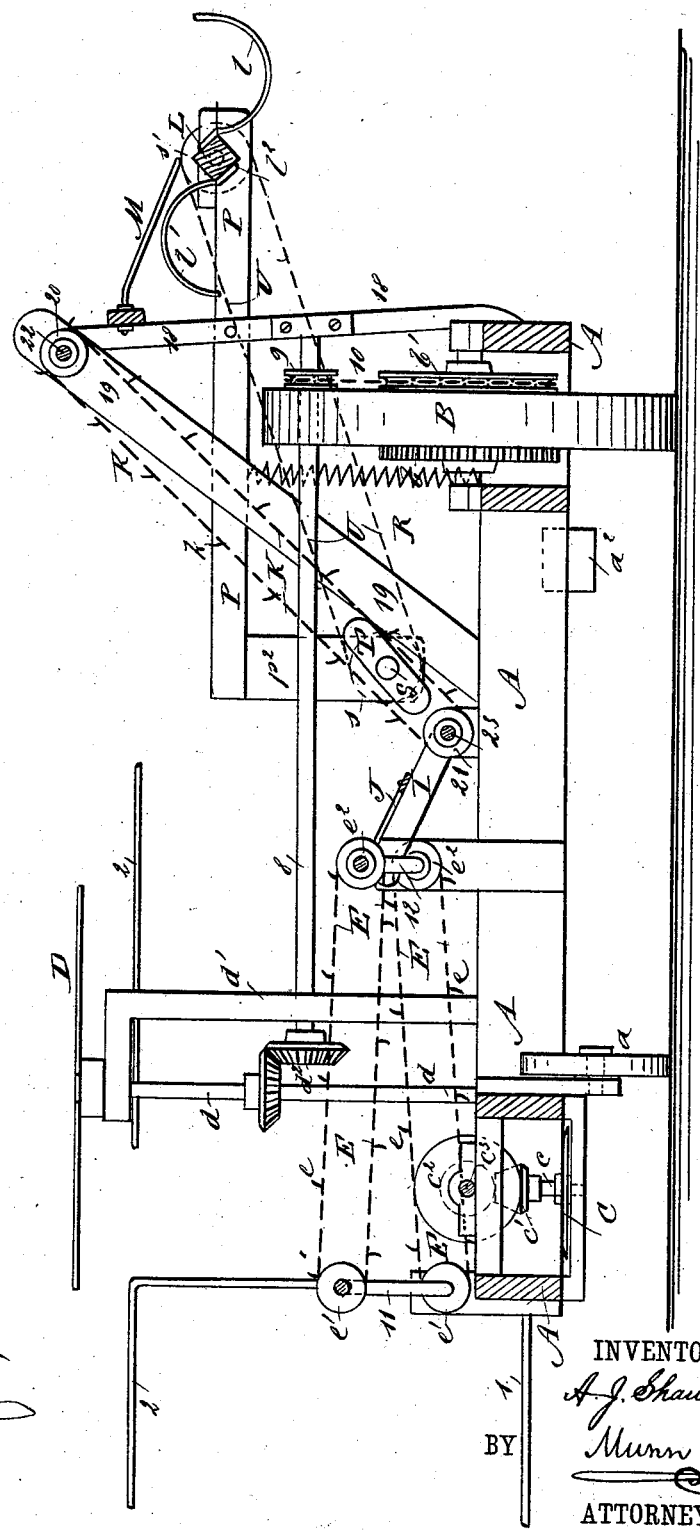

Figure 1 is a plan view of my improved cane or corn harvester, partly broken away. Fig. 2 is a side elevation thereof, also partly broken away. Fig. 3 is a transverse front vertical sectional elevation of the machine, taken on the line $xx$ of Fig. 1. Fig. 4 is a rear sectional view taken on the same line $xx$ of Fig. 1. Fig. 5 is a front vertical sectional elevation taken across the rear part of the machine and on the line $yy$ of Fig. 1, and Figs. 6 and 7 are detail plan views illustrating modifications of the stalk-cutting mechanism.

The main or base frame, A, of the machine is supported on a large wheel, B, which is also the driving-wheel imparting motion to most of the mechanism of the harvester, and on a smaller wheel, $a$, journaled directly opposite the wheel B, and on a trailing wheel, $a'$, journaled at the extreme rear end of the frame. A tongue or pole, $a^2$, provides for hitching one or more teams of horses to the machine to draw it along the rows of cane, corn, or other standing crops for the harvesting of which the machine is adapted. The trailing wheel $a'$ is journaled to a standard or leg, $a^3$, which slides vertically in a socket or bearing on the main frame, and is connected pivotally with a lever, $a^4$, which is fulcrumed at one end to the frame, and may be operated to raise or lower the rear end of the frame, and may be locked by a pin or bolt, $a^5$, passed through any one of a series of holes in the upright $a^6$, fixed to the frame, for holding the forward end of the frame nearer to or farther from the ground to support the cane or corn cutter C at proper distance from the ground to cut down the crop.

The cutter C (shown in Figs. 1, 2, and 4 of the drawings) is made in disk form, or like a circular saw, and may have any preferred form of teeth best suited to cut the crop. The cutter is fixed to a shaft, $c$, journaled vertically at the front left-hand corner of the frame and in a rearward recess of the frame, at each side of which recess lower and upper pairs of flaring metal rods, 1 1 and 2 2, are fixed to gather in or guide the standing stalks of cane to the knife as the machine moves forward. The cutter C is rotated about in a horizontal plane by the meshing of a bevel-pinion, $c'$, fixed to its shaft, with a bevel gear-wheel, $c^2$, fast on a shaft, $c^3$, which carries a bevel-pinion, 3, meshing with a larger bevel gear-wheel, 4, fixed to a shaft, 5, which is journaled transversely in the main frame, and by suitable clutch mechanism, hereinafter described, has connection with a shaft, 6, which carries a pinion, 7, meshing with a larger gear-wheel, $b$, fixed to the inner face of the drive-wheel B, or to the shaft of said wheel.

A reel, D, fixed to a shaft, $d$, journaled vertically in the main frame A, and an upright, $d'$, thereon rotates horizontally to force the standing cane or corn backward to the knife C, and also to lay the severed stalks over evenly upon traveling chains E, which have hooks $e$, which carry the stalks upward to the topping-knife, as presently explained.

The reel D is operated through the medium of bevel-gears $d^2$, connecting its shaft with a transversely-ranging shaft, 8, journaled in the upright $d'$, and at another upright at the farther side of the machine, and this shaft 8 carries a chain-wheel, 9, which is connected by a driving-chain, 10, with a chain-wheel, $b'$, fixed to the outer face of the main drive-wheel B, or to the axle of said wheel. The carrier-chains E are fitted upon chain-wheels $e'$ $e^2$, which are fixed to shafts 11 12, respectively, and motion is imparted to the shaft 11 by means of a driving-chain, 13, which is fitted to a chain-wheel, 14, on shaft 11, and to a chain-wheel, 15, on a short shaft, 16, which carries a bevel-pinion, 17, which meshes with the bevel gear-wheel 4, turned from the main drive-wheel B, as above described. The outside carrier-shaft, 11, ranges upward from a point a little above the cutter C to the top of the frame or table F, which is built upon the main frame A at the rear end of the machine, and in which the rear ends of the carrier-shafts 11 12 are journaled. The carrier-shaft 12 is also inclined, but to a less extent than the shaft 11, and the rear end of said shaft 12 is journaled in a downward offset at the forward end and outer side of the frame or table F, or a little below the driving-shaft G of the topping cutter or saw H, which is mounted on and is adjustable along said shaft G, as hereinafter described. The inclined positions of the shafts 11 12 allow the cut stalks laid on the carrier-chains E to be carried upward or outward, while their tops lie upon and move over the frame or table F to the cutter H, which cuts off the tops of the stalks. The position of the rear end of the shaft 12, as above described, allows effective action of the cutter H on the cane-stalks.

After the stalks are "topped" by the knife H they are forced by the carrier E over pieces I, connected by braces J, and forming a bridge to an outer series of chains, K, which are inclined upward toward the outside, and have hooks $k$, which carry the stalks upward and discharge them into a reversible cradle or dropper, L, which is rotated to dump the stalks to the ground, as hereinafter explained. The stalks pass from the carrier-chains K onto and over a series of inclined arms or rod-guides, M, fixed to a cross-bar secured to the uprights 18, which support the upper ends of inclined frame-bars 19, the lower ends of which, as also the lower ends of the uprights, are fixed to the main or sill frame A of the machine. The carrier-chains K pass over chain-wheels 20 21, which are fixed to upper and lower shafts, 22 23, respectively, which are journaled on the machine-frame, and the carrier-chains K are operated by a chain-belt, 24, which runs from a chain-wheel, 25, on the shaft 23, to a chain-wheel, 26, on the topping knife shaft G, which latter is rotated from the shaft 12 of the carrier-chains E by a belt, 27, which runs from a chain-wheel, 28, on said shaft 12 to a chain-wheel, 29, on the shaft G', all as clearly shown in the drawings.

The topping cutter or saw H is fixed to a sleeve or arbor, $h$, which is fitted to the square or flat sided shaft G, so as to rotate with this shaft and be adjustable along it, and the saw sleeve or arbor is fitted in suitable journal-bearings, $h'$, which are fixed to a head-block, N, which is adapted to slide on a horizontal bar, $a^7$, ranging horizontally and fixed to the main frame A of the machine. The head-block N has a tail-piece, $n$, which extends rearward and rests on the sill-bar $a^7$, and passes between an upright, $a^8$, fixed to the frame and an upright, $a^9$, in which the outer end of the topping-knife shaft G is journaled.

The tail-piece is provided with a series of notches, $n'$, into any one of which may be set the lower end of a lever, O, which is fulcrumed to the head of the upright $a^8$, and is normally held in engagement with a notch, $n'$, by a spring, $o$, connected to the upright and lever. (See Figs. 1, 2, and 5 of the drawings.) It is obvious that after disengaging the lever O from the tail-piece $n$ the head-block N, with the topping-knife H, may be slid backward or forward on the driving-shaft G to set the knife farther from or nearer to the carrier-chains, to cause more or less of the tops of the cane or corn to be severed from the bodies of the stalks as they are carried along past the knife, and as the nature or size of the crop shall require. As the cane or corn stalks approach the cutter H their tops slide down inclined fingers $f$, fixed to the frame F, and beneath a guard-plate, H', which is fixed to the head-block N, and which guides the stalks to the knife and holds the tops until they are severed, and causes them to drop to a table to be built on the frame A below the topping-knife and upper frame, F.

After the topped stalks are thrown or cast from the carrier-chains K onto the rod-guides M they slip down these guides by gravity into the outermost series of arms, $l$ or $l'$, ranging along one side of the reversible dropper L, said dropper having two series of arms, $l\ l'$, which alternately receive the stalks from the guides M and dump them to the ground. The dropper-shaft $l^2$ is journaled in the outer ends of the front and rear bars or levers, P P', which are fulcrumed at $p$ to the frame-uprights 18, and are normally held by springs R, to support the dropper L in position to receive the stalks. The inner end of the lever P is provided with a pendent bar or extension-piece, $p^2$, in the lower end of which a short shaft, S, is journaled. On one end of this shaft an oblong latch or trip-block, T, is fixed in a position to cause either one of its ends to bear upon the adjacent inclined bar 19 of the machine-frame, and on the other end of the shaft S a chain-wheel, $s$, is fixed. A chain, U, runs over the wheel $s$ to a chain-wheel, $s'$, which is fixed to the dropper-shaft $l^2$.

The trip-block T normally prevents turning of the dropper L by the weight of the stalks on one side, so long as the tension of springs R are not overcome; but when the cane-stalks overbalance the dropper-frame P P' against the tension of the normally-contracting springs R, or, in other words, when one side $l$ or $l'$ of the dropper receives from the carrier K and guides M a sufficient quantity or weight of stalks to tilt the dumping-frame until the latch-block T is lifted clear of the frame-bar 19 the dropper will, by the weight of the stalks, turn one-half a revolution to dump the stalks to the ground, and present its other series of arms to receive the stalks from the carrier as the springs R promptly swing the dropper-frame up again to normal position, while the trip-block and chain U limit the turning to one-half a revolution, until the weight of the stalks again tilts the dropper-frame to dump the stalks, as will readily be understood.

To prevent operation of the cutter C, the carrier chains E K, and the topping-cutter H, as the machine is drawn along the road to and from the place of use, the shafts 5 and 6 are connected by and the former supported by a clutch device comprising a toothed head, 30, fixed to the shaft 5, and an opposite toothed head, 31, fitted to slide on the square part of the shaft 6, and engaged by the forked end of a lever, 32, which is fulcrumed at 33 to the machine-frame, or to a bracket thereon, and is adapted to be locked into one of two notches made in a latch plate or bar, 34, fixed to the frame. It is obvious that when the lever is shifted to engage the half clutches or heads 30 31, as shown in Figs. 1 and 3 of the drawings, the cutters and carriers will be operated, and when the clutches are separated and so locked by the lever the cutters and carriers will be inoperative. The reel D may be thrown out of gear quickly by unshipping the chain belt 10 from the wheel $b'$ on the main drive-wheel.

In carrying out my invention I am not limited to the use of a rotating cutter, C, as above described, for cutting the cane or corn stalks, as a direct reciprocating knife, V, (shown in Fig. 6,) may be employed for the purpose. This knife V is fitted to slide in downwardly and forwardly inclined guides fitted in the frame A, just back of the stalk gathering or guiding rods $l\ l$, and is operated by a pitman, $v$, which is connected to a crank, $v'$, of a shaft, $v^2$, which is journaled in the frame A and carries a wheel, 35, from which a driving-chain, 36, runs to a chain-wheel, 37, on the end of the driving-shaft 5, which is operated from the main drive-wheel B, as above described.

A further modification of the stalk-cutting mechanism is shown in Fig. 7 of the drawings, and consists of a knife or blade, W, which is pivoted at $w$ to the frame A, and is connected by a bracket, $w'$, with a pitman, $w^2$, which is in turn connected to a crank, $w^3$, fixed to a prolongation of the driving-shaft 5, whereby the knife W will be carried to or in between a couple of resistance bars or plates, X, fixed to the machine-frame. Brace-bars Y, fixed in laterally-inclined positions to the frame A, serve as guides between which the knife W moves, and hold the knife well to its work. A guide rod or bar, Z, fixed to the outer end of the knife W prevents passage of the stalks behind the moving knife as the machine is drawn along the field, and assures the entrance of the stalks between the knife and the resistance-bars Z to cause them to be severed by the knife.

Whether the cutters C, V, or W are used, the cut stalks will fall onto the carrier-chains E, and will be topped by the cutter H and delivered by the carrier-chains K to the cradle or dropper L, which will dump them to the ground in bundles or bunches of a given weight, all as hereinbefore explained.

By modifications in the construction easily made the machine may be arranged to cut down two or more rows of cane, corn, or other standing crop at once, as will readily be understood.

Having thus fully described my invention, what I claim as new, and desire to secure by Letters Patent, is—

1. The combination, in a cane-harvester, of a frame, A, a drive-wheel, B, thereon, a stalk-cutter operating at the front of the machine, carrier-chains E K on the frame, a topping-cutter, H, operating on the frame A, or an elevated frame or table, F, thereon, gearing, substantially as specified, operating the stalk-cutter, the carriers E K, and the topping-cutter H from the drive-wheel B, a reversible cradle or dropper, L, journaled to levers P P', fulcrumed on the frame, springs R, returning the dropper to normal position, a trip-block, T, fixed to a shaft, S, and adapted to stop against the machine-frame, wheels $s\ s'$ on the shaft S and the dropper-shaft, respectively, and a chain, U, connecting the wheels $s\ s'$, substantially as described, for the purposes set forth.

2. In a harvester, the combination, with the frame and the rotary dropper, of a trip mechanism preventing the rotation of the dropper and automatically released by the gavel of stalks held by said dropper, substantially as set forth.

3. The combination, with the main frame, the upward-extending frame thereon, the horizontal frame pivoted thereto, and the rotary dropper journaled in the outer end of said pivoted frame and provided with a chain-wheel, of the chain-wheel journaled at the inner end of said dropper-frame, a trip-block connected with said chain-wheel and normally bearing against the upward-extending frame to prevent the rotation of said chain-wheel, a chain connecting said wheels, and means for returning the trip-block and dropper-frame to their normal positions, substantially as set forth.

4. The combination, in a cane-harvester, of a topping-cutter, H, fitted to a flat-sided shaft, G, and held to a head-block, N, adjustable on the machine-frame, a tail-piece, $n$, fixed to the head-block and provided with a series of notches, $n'$, and a lever, O, fulcrumed to the frame and adapted to lock into any one of said notches, substantially as shown and described.

5. The combination, in a cane-harvester, and with the machine-frame, of a cradle or fork receiving the cut stalks, and consisting of opposite levers, P P', fulcrumed at $p$ to the frame, a reversible dropper, L, journaled to the levers and provided with opposite series of arms, $l\ l'$, springs R, returning the dropper to normal position after it is tilted and rotated, a trip-block, T, fixed to a shaft, S, in the frame and adapted to stop against the frame, wheels $s\ s'$ on the shaft S and dropper-shaft, respectively, and a chain, U, connecting the wheels $s\ s'$, substantially as described, for the purposes set forth.

6. The combination, with the frame A, the stalk-cutter at the front of the machine, and the top-cutter in rear of and above the stalk-cutter, of the longitudinal shafts 11 12 between the two cutters and inclined at different angles upward toward the top-cutter, the carriers on said shafts, and the operating mechanism, substantially as set forth.

AZRO JAMES SHAW.

Witnesses:
JOHN R. WRIGHT,
EDWARD J. KENNEDY.